Figure 4:
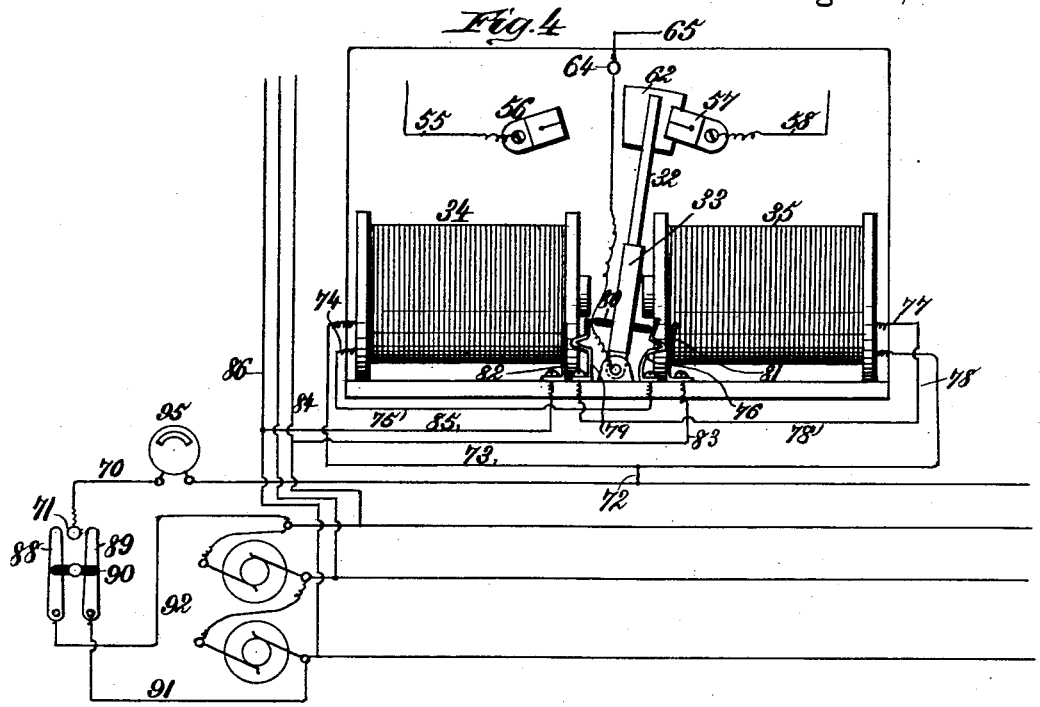

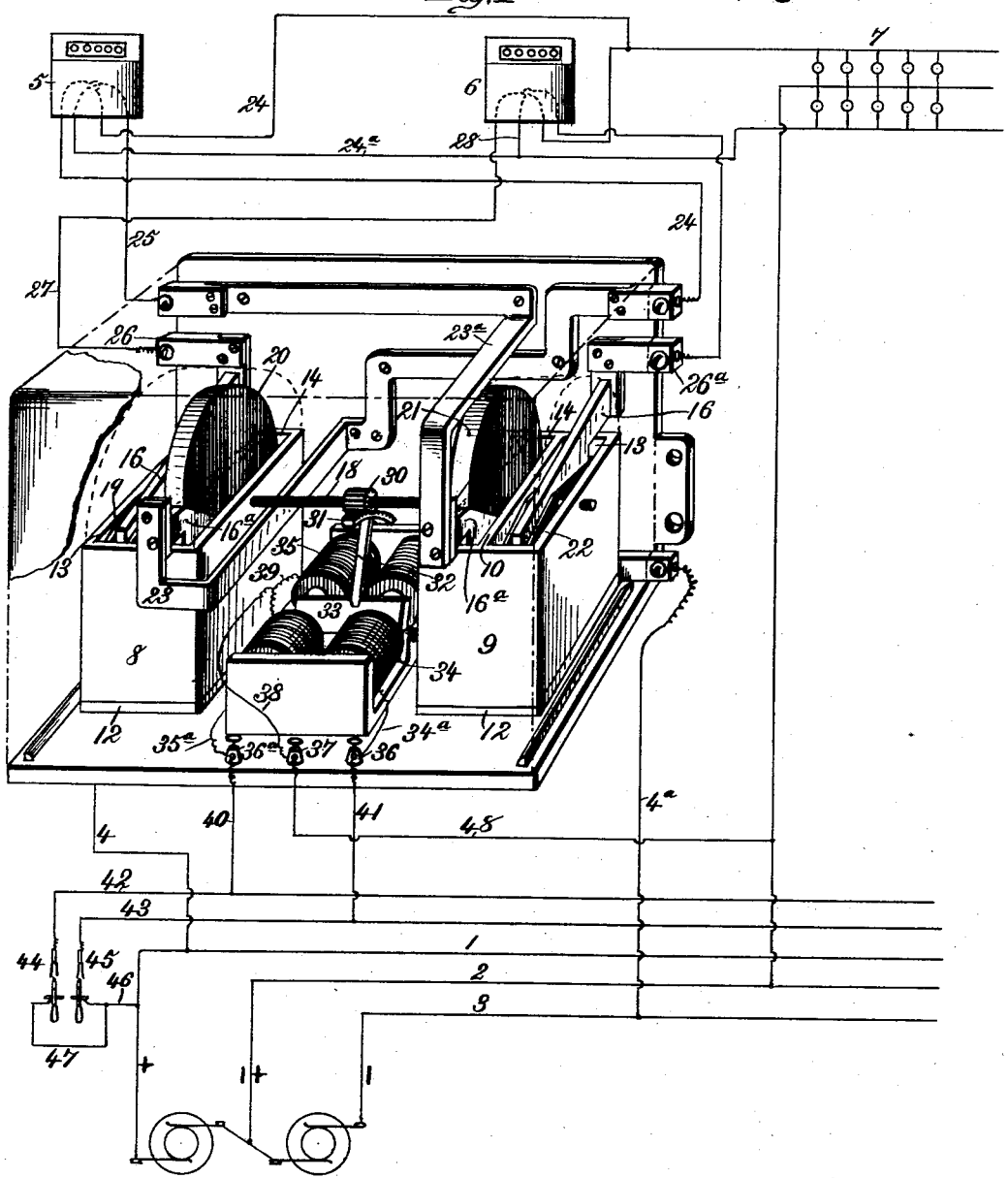

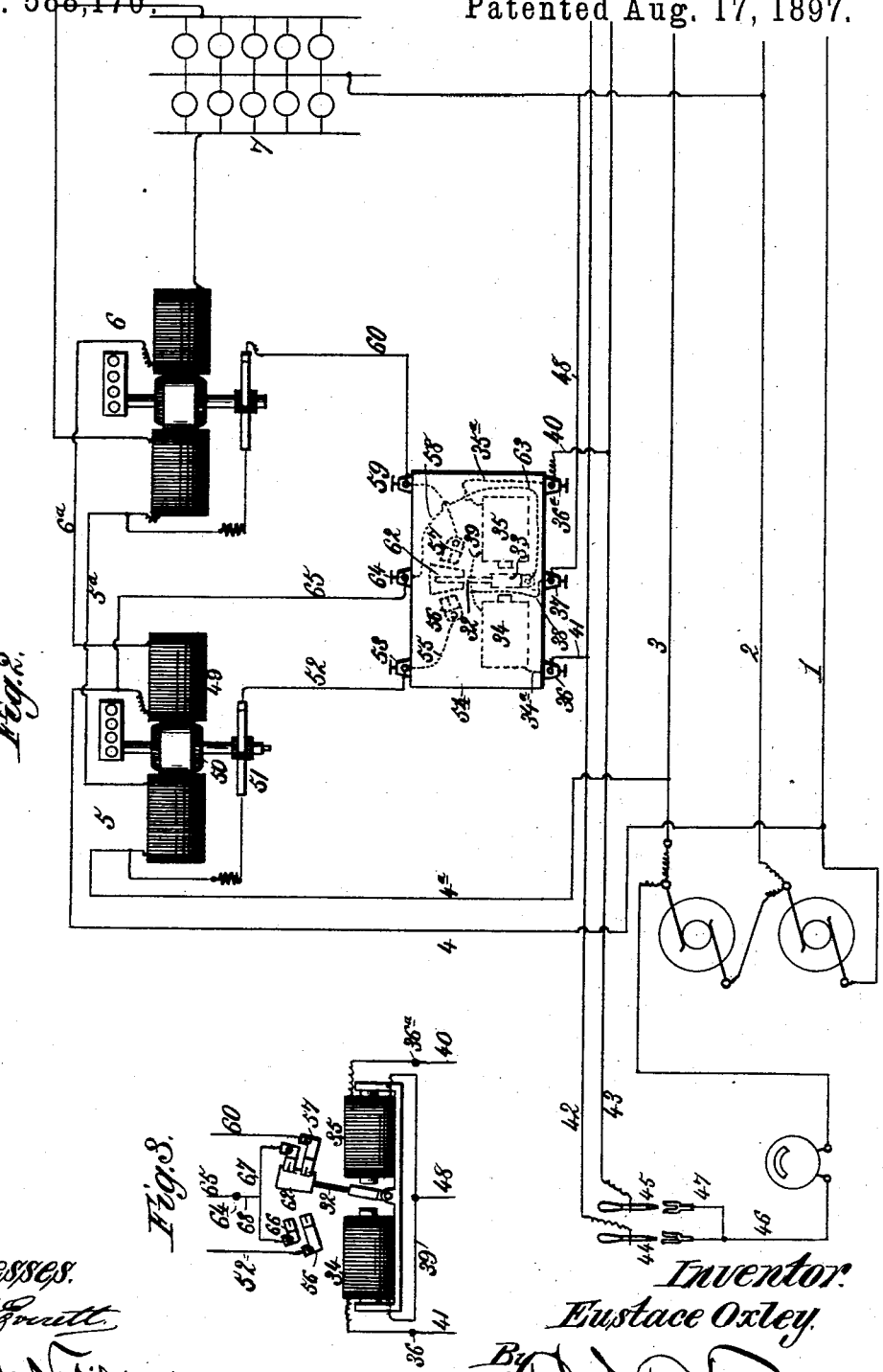

(No Model.) 4 Sheets—Sheet 3.

E. OXLEY.
METHOD OF AND APPARATUS FOR MULTIPLE RATE METERING FOR ELECTRIC CURRENTS.

No. 588,170. Patented Aug. 17, 1897.

Witnesses.
Robert Gratt
Philip N. Tilden

Inventor:
Eustace Oxley.
By [signature]
Atty.

(No Model.) 4 Sheets—Sheet 4.

E. OXLEY.
METHOD OF AND APPARATUS FOR MULTIPLE RATE METERING FOR ELECTRIC CURRENTS.

No. 588,170. Patented Aug. 17, 1897.

Witnesses.
Robert Emmett
Philip N. Tilden

Inventor.
Eustace Oxley.
By Chas. B. Tilden
Atty.

UNITED STATES PATENT OFFICE.

EUSTACE OXLEY, OF WASHINGTON, DISTRICT OF COLUMBIA.

METHOD OF AND APPARATUS FOR MULTIPLE RATE-METERING FOR ELECTRIC CURRENTS.

SPECIFICATION forming part of Letters Patent No. 588,170, dated August 17, 1897.

Application filed June 19, 1897. Serial No. 641,508. (No model.)

*To all whom it may concern:*

Be it known that I, EUSTACE OXLEY, a subject of the Queen of Great Britain, residing at Washington, in the District of Columbia, have invented a new and useful Method of and Apparatus for Multiple Rate-Metering of Electric Currents, of which the following is a specification.

In distributing electricity for light and power there occurs a period during each twenty-four hours when the demand for and consumption of the current is largely diminished, this being due to the fact that few, if any, of the consumers burn their full number of lamps during said period. A large part of the generating mechanism is therefore idle during this time, so much thereof only being operated as may be required for the production of the small amount of current used. A station or plant which generates current for lighting purposes only will have but a small demand during a longer period each day than a station which supplies current for both light and power, as the current required for power will be much larger during the day than at night. In both cases, however, there are certain hours during which part of the machinery of the plant will be idle. In proportion to this falling off in the demand for current more or less of the mechanism of the plant will fail to earn its part of the fixed charges. This idle period will be longer and the consumption of current less in stations supplying current for light only, as there will be no demand except for those lamps which are burned through the day only or both day and night. The number of these is usually small and the light load required for their supply will be generated at an expense which is out of all proportion to the cost of generating during the period of high or full load. It is well known to electrical engineers that a full load can be generated much more economically than a small load, so far as the proportionate consumption of fuel and the wear and tear of machinery are concerned. As competition between rival companies increases it becomes a factor of the highest economic importance to devise means whereby the consumption of current during the day or during the period of light load may be increased and caused to approach more nearly to a full load in order that every part of the machinery of the plant may earn its share of the fixed charges. As the current is used for power during the day, or mainly so, when the lights are not needed it has been customary to offer inducements whereby its use for such purpose may be extended. The usual inducement consists in offering to supply current for motors at lower rates than for lamps, and many plants make a larger discount upon their bills where motors are employed, a nominal profit being a greater advantage than to have a large part of the machinery thrown out of use during a considerable portion of each twenty-four hours. Under such an arrangement the customer who burns all or part of his lights during the daytime is naturally led to inquire why similar advantages should not be extended to him also. He is as much entitled to demand this as the customer who uses motors only, but the company is compelled to reply that while they admit the justice of his demand it is not in their power to grant it. To enable them to furnish current at such low rates and during so many hours of each day, it is essential that the consumption be measured. To do this, two meters or registering mechanisms must be furnished, one measuring the consumption during the hours of full load or normal rate of charge and the other making an entirely separate measurement during the hours of light load or low rate. It is impossible, of course, to rely upon the customer to operate the switch or other means by which one meter is cut in and the other out at the time fixed; nor is it feasible to rely upon employees to attend to such apparatus, even if such a plan was not prohibited by economic considerations. So far as I am aware no practical means are now in use whereby such an operative alternation of two meters is effected.

It is the purpose of my invention to supply this want by providing apparatus of marked simplicity and cheapness capable of being operated from a single point, such as the central station, and by a single movement, whereby all the meters or registering mechanisms registering consumption at one rate upon a line having a number of consumers shall be operatively removed from the circuit simultaneously and all the meters which register consumption at a different rate shall be brought operatively into circuit at any time fixed. It is my aim also to accomplish this purpose at a very small expense, to avoid the necessity of using batteries or other generators provided specially for this purpose, to effect the change from one meter to the other without extinguishing any lamps upon the circuit, to avoid sparking and arcing, and to render the operation of the apparatus entirely accurate and certain without the necessity of frequent repairs and adjustments.

To these ends my invention consists in the several novel features of construction and new combinations of parts hereinafter fully explained and then particularly pointed out and defined in the claims which conclude this description.

For the purposes of the following specification reference will be made to the accompanying drawings, in which—

Figure 5:
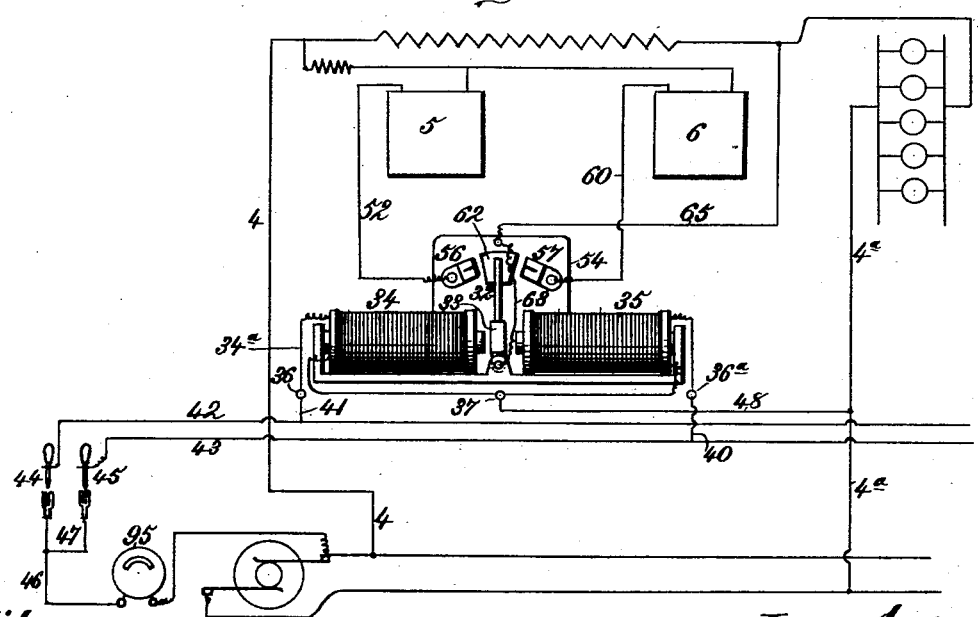
Figure 6:
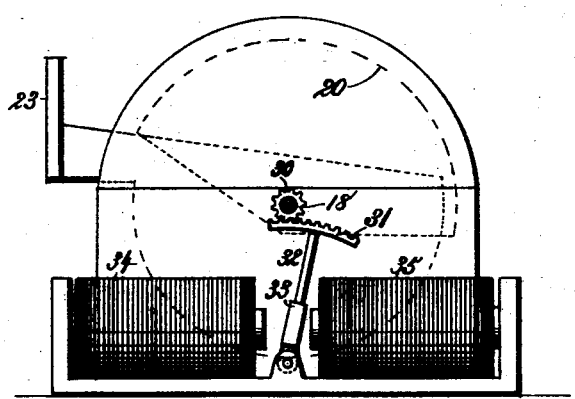
Figure 7:
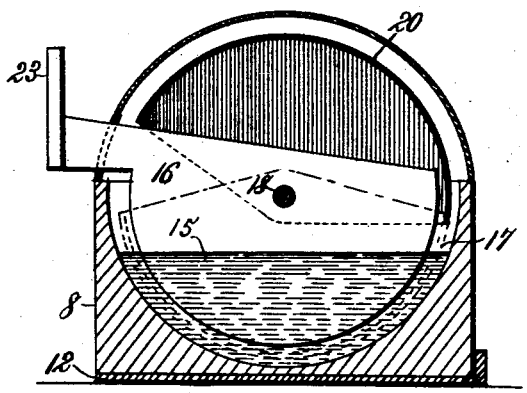

Figure 1 is a perspective view of one form of switching apparatus with a diagram of circuits employed therewith. Fig. 2 is a diagram showing the application of my invention to two meters operated by motors in such manner that the armatures are cut out of and into circuit. Fig. 3 is a detail view showing a modification whereby the operative circuit of each meter is made and opened by connecting or disconnecting two clips by means of a knife-contact. Fig. 4 is a diagram showing a one-wire switch-controlling circuit. Fig. 5 is a diagram showing the adaptation of my invention to chemical meters of the Edison type. Fig. 6 is a side elevation showing the two electromagnets and one of the switch-cells seen in Fig. 1. Fig. 7 is a vertical section of the apparatus shown in Fig. 6, taken from end to end through the central longitudinal line of the cell.

The reference-numerals 1 2 3 in said drawings indicate the mains in a three-wire system of electric distribution. In this instance I have shown a three-wire system, but my invention is applicable to any other without change or adaptation requiring explanation. From the positive main 1 a service-wire 4 is tapped off at a suitable point to the translating device employed by a consumer, a single consumer's circuit only being shown in this instance. I have shown lights only upon this consumer's circuit, but it is evident that any other apparatus using current may be employed. At each point where a customer desires current during the day or hours of light load at a special rate two meters 5 and 6 are placed. Each meter is independently connected with the light or other circuit 7 through an electromagnetic switch, which I will now describe.

Referring to Figs. 1, 6, and 7 in the drawings, the numerals 8 and 9 indicate two containing vessels, each of which has a central partition 10. These vessels may be made of conducting metal, or they may be of any other material and lined with conducting metal. They are preferably placed upon bed-plates 12, of copper or other suitable conducting metal. The central partition 10 divides each vessel 8 and 9 into two chambers or cells 13 and 14, in which I place a suitable conducting liquid 15, such as mercury. I prefer to make each cell with a semicircular bottom and end wall, as seen in Fig. 7, but this feature is no essential part of my invention. Dipped in the mercury in cells 13 are switch-contacts or terminals 16, preferably of a form similar to the interior of the cell in which they lie, so that a limited space 17 lies between the contacts and the vessel. Similar contacts or terminals $16^a$ are placed in like manner in the cells 14.

In suitable bearings in the side walls of the vessels 8 and 9 is a non-conducting shaft 18, upon which are rigidly mounted four shells or hoods 19, 20, 21, and 22, the hoods 19 and 20 being arranged to act in alternation in the two cells 13 and 14 in the vessel 8, while the hoods 21 and 22 have a similar arrangement in relation to the cells 13 and 14 in the vessel 9. The hoods 19 and 22 are arranged to move in unison or to enter and pass out of the two cells 13 at the same time, while the two hoods 20 and 21 also act in unison, but alternate with the hoods 19 and 22. In other words, the two last named lie upon one side of the shaft 18 and the hoods 20 and 21 lie upon the side diametrically opposite. The result of this arrangement is that when one pair of hoods are turned down to surround the switch-terminals—in the cells 13, for example—the other pair is always up and entirely withdrawn from the cells 14. The hoods are made of or covered with non-conducting material and are as thin and light as possible. Their arrangement is such that upon turning the shaft 18 in one direction through a half-revolution one pair of hoods—as, for example, 19 and 22—will pass into the mercury in two of the cells—as, for example, those denoted by the numeral 13—and these hoods, following the spaces 17, will surround the contacts or terminals 16. If now the shaft 18 is turned in a contrary direction, it will withdraw the hoods 19 and 22 from both cells 13, thereby permitting the mercury to come in contact with the terminals 16 lying in those cells, while at the same time the hoods 20 and 21 will be brought into the cells 14 and caused to surround the electrodes $16^a$ in said cells, thereby interposing a non-conducting barrier or wall between said terminals and the mercury through which the current passes when the circuit is closed. The arrangement of circuits for this form of switch upon a customer's premises is shown in Fig. 1, in which the service-wires are connected as follows: From the positive main 1 by a wire 4 to the conducting base-plate 12 beneath the mercury-cup 8. From the terminal $16^a$, lying in the cell 14, a connection 23 and wire 24 go to the meter 5 and through the same to one leg of the lamp-circuit 7. From the other leg of this circuit a wire $24^a$ returns to the meter 5, and thence the circuit is completed by a wire 25, which goes to a connection 23ª upon the terminal 16ª in the cell 14 of the mercury-cup 9. Thence the current passes by a service-wire 4ª to the negative main 3 of the system.

From the terminal 16 in the cell 13 of cup 8 a connection 26 rises, from which a wire 27 is taken into the second and independent meter 6, from which it goes to the circuit 7. Returning from the latter over wire 24ª a wire 28 goes from said wire 24ª back to the meter 6, and thence the said wire goes to a connection 26ª in cell 13 of cup 9. Thence the wire 4ª completes the circuit. It will be understood that the service-wires 4 and 4ª carry the current to either cell 13 or 14 in both cups, its course being determined by the interposition or non-interposition of the hoods.

Upon the non-conducting shaft 18 is a pinion 30, with which a sector-gear 31 has mesh, the latter being upon a radius-bar 32. Upon said bar, a little above its pivot, is an armature 33, and upon opposite sides of the latter are electromagnets 34 and 35.

The magnet 34 has one terminal 34ª of its winding connected to a binding-post 36 on the non-conducting base. One terminal 35ª of the other magnet 35 is similarly connected to a separate binding-post 36ª, and from a central binding-post 37 a wire 38 is carried and connected to two united terminals 39 of both magnets. From the binding-posts 36 and 36ª wires 40 and 41 are led to two small wires 42 and 43, which form the switch-controlling circuit. These wires may be, and preferably are, of small size, No. 8 or No. 10 Brown & Sharpe gage being of ample diameter. Said wires are preferably run in the conduits or upon the supports carrying the mains, and they extend along the entire system. So whenever a consumer desires to have current furnished during the hours of low rate it is only necessary to provide the switch apparatus and an additional metering mechanism and connect the same with the switch-controlling circuit by two wires similar to 40 and 41.

The two wires 42 and 43 emanate from some suitable single point, such as the central station, where two small switches 44 and 45 connect them, respectively, to the main over a wire 47. Closing the switch 44, the other switch 45 remaining open, the circuit will be as follows: over wires 46 and 47, wire 42, wire 40, binding-post 36ª, terminal 35ª, winding of magnet 35, over part of the united terminals 39, wire 38, binding-post 37, and thence over a wire 48 to the neutral wire of the lamp-circuit, the latter going to the neutral main 2, thereby completing the switch-circuit. This energizes the magnet 35, which draws the armature 33 over into the position substantially as shown in Fig. 1, thereby rotating the shaft 18 and turning the hoods 19 and 22 down into the mercury in the cells 13 and at the same time turning the hoods 20 and 21 out of the cells 14, by which the circuit of the meter 5 is established.

If the switch 44 is opened and switch 45 closed, the circuit will be over wire 46, wire 43, wire 41, binding-post 36, terminal 34ª, winding of magnet 34, over the united terminals 39 as far as wire 38, then over the latter to binding-post 37, and from there by wire 48 to the neutral wire and neutral main 2. It will be understood that it is only necessary to keep either switch 44 or 45 closed a fraction of a minute in order to effect the desired operation.

I have shown in Figs. 2 and 3 slight modifications of the arrangement in Fig. 1, the main feature of which consists in controlling the alternation of the two meters through their armature-circuits. In Fig. 2 I have indicated said meters by means of their field-coils 49 and armatures and brushes 50 and 51. The meters, each as a whole, I have denoted by the same reference-numeral already used, and the other parts, so far as they correspond to features already described, I have indicated by the same numerals as in Fig. 1. These parts, therefore, will require no description.

The field-coils 49 of the meter 5 I connect with the positive and negative mains 1 and 2 by service-wires 4 and 4ª, and the same coils of the meter 6 I connect in series by wires 5ª and 6ª. From one brush 51 in meter 5 a wire 52 is carried to a binding-post 53 on the switch-base 54, and from said binding-post a wire 55 (shown in dotted lines) is taken to a clip-contact 56. From another and similar clip 57 wire 58 goes to a binding-post 59, whence a wire 60 goes to a brush of the second meter 6.

The clips 56 and 57 are placed upon opposite sides of the radius-bar 32, which has a double knife-contact 62. From the pivotal support of the bar 32 a wire 63 goes to a binding-post 64, and from the latter a wire 65 is led to the service-wire 4 and united to it.

When the switch 44 is closed, 45 remaining open, the circuit will be over wires 46, 42, and 41 to binding-post 36, then over terminal 34ª, winding of magnet 34, united terminals 39, wire 38, binding-post 37, and wire 48 to the neutral wire of the lamp-circuit 7 and then to the neutral main 2. This causes magnet 34 to attract the armature 33 and draws the knife 62 into the clip 56, thereby establishing the armature-circuit of the meter 5. Opening switch 44 and closing 45 the current passes over wires 46 47 43 40 and binding-post 36ª to terminal 35ª, winding of magnet 35, terminal 39, wire 38, binding-post 37, wire 48, and neutral wire to neutral main, as before, thereby causing magnet 35 to attract the armature 33 and draw the knife 62 into the clip 57, thus establishing the circuit of meter 6. In this arrangement of circuits the current supplied to the armature 50 being only one-tenth of an ampere, or thereabout, I prefer to simplify the construction by using the clips 56 and 57. I may also duplicate said clips on each side of the radius-bar, as shown in Fig. 3, and close the circuit of either meter by using the knife-contact 62 to bridge the current over the interval separating the clips of each pair. In this case the duplicated clips 66 are connected by a wire 67, from which a wire 68 is carried to the binding-post 64. This wire 67 is a substitute for the wire 63 in Fig. 2.

I have shown in Fig. 4 a one-wire switch-circuit, in which I run a single wire 70 from a single switch-contact 71 throughout the system in place of the two wires 42 and 43. The magnets 34 and 35 are arranged as before with the radius-bar 32 and clips 56 and 57. From the wire 70 a wire 72 is tapped off for each pair of switch-magnets 34 and 35. Said wire connects with a wire 73, which connects with and forms part of the two windings 34 and 35. From the out-coming terminal 74 of the magnet 34 a wire 75 is led to a spring-contact 76, placed on the insulating-base of the switch close to the end of the magnet 35. The terminal 77 of magnet-winding 35 is connected to a wire 78, which goes to a spring-contact 79, arranged near the end of magnet 34. The radius-bar or armature 33 carries a cross-pin 80, of non-conducting material, which strikes either spring-contact 76 or 79 as the armature is thrown in one direction or the other, thereby pressing the spring-contact it strikes against a contact 81 near the spring 76 or 82 near the spring 79. From the former 81 a wire 83 goes to a wire 84, and from the latter 82 a wire 85 goes to the wire 86. The wire 84 connects with either the positive or negative and the wire 86 with the opposite side of the system. Current, therefore, will energize one or the other of said magnets according to the manipulation of a switch, which may be of any suitable form, that shown consisting of duplex pivoted arms 88 and 89, connected by an insulated bar 90. Wires 91 and 92 from the positive and negative mains are led to the pivoted bearings of said arms.

If the switch-arms are turned to bring the arm 89 on the contact 71, the current is over wires 91 70 72 73 to winding 34, and thence by terminal 74, wire 75, spring-contact 76, contact 81, wires 83 and 84, back to the other side of the system, thereby energizing magnets 34 and drawing the armature 33 and radius-bar 32 to the left in Fig. 4. This strikes the knife 62 into the clip 56 and establishes the circuit of one meter while it simultaneously arrests operation of the other meter. The other circuit completed by bringing the arm 88 upon the contact 71 is so plain as to require no recital.

I have shown in Fig. 5 an arrangement adapted to a two-wire system using the Edison chemical meter. The circuits therein are substantially the same as in Fig. 2, except so far as relates to the plain adaptation to this special type of meter. These are so clearly understood by all electricians as to render detailed description superfluous.

I prefer to place a current-indicator, such as an ammeter 95, in the switch-circuit to indicate whether the several switch mechanisms are working properly. The ordinary ammeter will answer for this purpose, as it will show the quantity of current upon the circuit, and by dividing the indicated quantity in amperes or fractions of the same by the whole number of switches in the circuit the result will show whether all of said switches are in operation.

What I claim is—

1. In a system of electrical-current distribution, the method described of separately metering the consumption of currents during different periods, which consists in connecting with each of a series of consumers' circuits a plurality or series of metering mechanisms, electrically controlling from a single point the operative selection of one series, and simultaneously effecting from said point the connection of all the meters of that series and the disconnection of the other series, substantially as described.

2. In a system of electrical-current generation and distribution, the combination with a series of consumers' circuits, of a corresponding series of electric metering mechanisms arranged upon the premises of a number of consumers to separately register the consumption of current by each of said consumers during a given period, a separate series of metering mechanisms to register separately the consumption of current during a different period and at a different rate, and means for electrically controlling, from a single point, the operative selection of either of the said two series of metering mechanisms, substantially as described.

3. In a system of electric distribution, the combination with two series of independent registering mechanisms of a single controlling-circuit including one of the operative parts of each metering mechanism, a connection from the mains of the system to the wires of said controlling-circuit, and means located at a single point for opening and closing the controlling-circuit from either of said mains substantially as described.

4. In a system of electrical distribution, the combination with two series of independent registering mechanisms, one of each series being arranged upon the premises of each consumer, of controlling-circuits including wires from two different mains of the system, connections from said wires to the armature-circuits of the several meters, and means located at a single point, such as a central station, whereby the controlling-circuits including said wires may be opened and closed alternately, substantially as described.

In testimony that I claim the foregoing as my own I have hereto affixed my signature in the presence of two witnesses.

EUSTACE OXLEY.

Witnesses:
JOHN H. SIGGERS,
PHILIP N. TILDEN.